Dec. 11, 1945.  W. G. COOK  2,390,778
ELECTRICAL GROUND DETECTOR
Filed Sept. 15, 1942
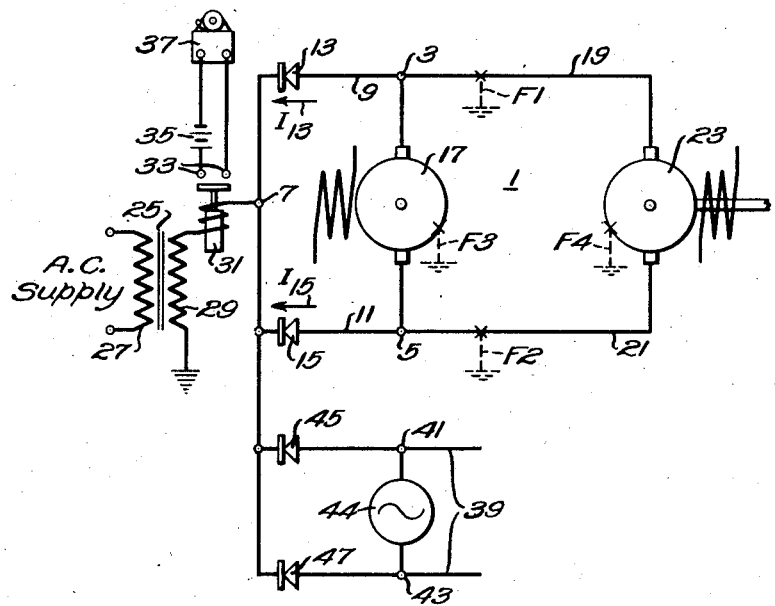
WITNESSES:
Robert C. Baird
Dw. C. Groome
INVENTOR
Willard G. Cook.
BY C. L. Freedman
ATTORNEY Patented Dec. 11, 1945

2,390,778

UNITED STATES PATENT OFFICE 2,390,778

ELECTRICAL GROUND DETECTOR

Willard G. Cook, Wilkinsburg, Pa., assignor to Westinghouse Electric Corporation, East Pittsburgh, Pa., a corporation of Pennsylvania Application September 15, 1942, Serial No. 458,361

7 Claims. (Cl. 175—294)

This invention relates to protective arrangements for electrical systems, and it has particular relation to arrangements for detecting the presence of faults on electrical systems.

Many electrical systems of large capacity are of a type where the entire system is ungrounded. In a system of this type, the occurrence of a single ground fault on the system has no noticeable effect. The only effect of a single ground fault is to increase somewhat the danger to men working on or adjacent the system.

If the single ground fault is undetected, the system may continue in operation until a second ground fault occurs thereon. The occurrence of a second ground fault may complete a circuit for the flow of substantial ground fault current and may result in substantial damage to the system.

In accordance with the invention, ground faults on an electrical system are detected by applying between the system and ground a fault-detecting-voltage. A ground fault on the system consequently completes a circuit for the fault-detecting-voltage and current, preferably small, flows to the fault. Fault-detecting means such as a relay responsive to the fault current is provided for indicating the presence of the fault, for tripping circuit breakers to disconnect sources of energy from the system or for performing any other desired control function.

If the system includes a pair of terminals across which a voltage is applied, the invention contemplates the connection of the fault-detecting-voltage between ground and both of the terminals. Unidirectionally-conductive devices such as barrier-layer rectifiers are provided in the connections between the terminals to prevent the establishment of a current conducting path therebetween.

It is therefore an object of the invention to provide an improved protective arrangement for electrical systems.

It is a further object of the invention is provide an electrical system having terminals between which a voltage is applied, with fault-detecting means for applying a voltage between ground and both of the terminals of the system.

It is another object of the invention to provide an electrical system having terminals across which a voltage is applied, with a ground-fault detector including means for applying a voltage between ground and both of the terminals of the system, and unidirectionally-conductive devices in the connections to the terminals for preventing the establishment of a conductive path therebetween.

Other objects of the invention will be apparent from the following description taken in conjunction with the accompanying drawing, in which the single figure is a schematic view of an electrical system embodying the invention.

Referring to the drawing, the single figure shows an electrical circuit 1 having two terminals 3 and 5 across which a voltage is to be applied. This voltage may be a direct voltage either fixed or reversible in polarity, or an alternating voltage.

To detect ground faults occurring on the electrical circuit 1, a ground detecting voltage may be applied between one or both of the terminals 3 and 5 and ground. If the voltage is applied between only one of the terminals, such as the terminal 3, and ground, the operation of the fault detector may not be uniform for all faults. For example, if a fault occurs adjacent the terminal 3, the voltage across the fault is equal to the ground detecting voltage. However, if a ground fault occurs on the system adjacent the terminal 5, the voltage across the fault is equal to the sum or difference of the ground detecting voltage and the voltage across the terminals 3 and 5. For this reason it is preferable that the ground-detecting-voltage be applied between ground and both of the terminals 3 and 5.

As shown on the drawing, the terminals 3 and 5 are connected to a common point or terminal 7 respectively through conductors 9 and 11. In order to prevent the conductors 9 and 11 from establishing a conductive path for current produced by a voltage across the terminals 3 and 5, a unidirectionally-conductive device is connected in either or both of the conductors. If a single unidirectionally-conductive device 13 is employed for the conductor 9, the polarity of the voltage across the terminals 3 and 5 must be such as to direct current in the blocking direction with respect to the unidirectionally-conductive device 13. To render the fault detector independent of the polarity across the terminals 3 and 5, an additional unidirectionally-conductive device 15 is provided for the conductor 11. These unidirectionally-conductive devices are so disposed as to pass current in the same direction with respect to the terminal 7. This direction may be either towards or away from the terminal 7, but for the purpose of discussion, the unidirectionally-conductive devices 13 and 15 are assumed to pass currents $I_{13}$ and $I_{15}$ towards the terminal 7. By inspection of the drawing it will be observed that the unidirectionally-conductive devices 13 and 15 are oppositely directed with respect to the series circuit formed by the conductors 9 and 11. For this reason a voltage across the terminals 3 and 5, regardless of its polarity, does not produce a flow of current through the conductors 9 and 11. Therefore the voltage across the terminals 3 and 5 may be a direct voltage of fixed or reversible polarity, or it may be an alternating voltage.

The unidirectionally-conductive devices 13 and 15 may be of any suitable type. As a specific example, the unidirectionally-conductive devices 13 and 15 may take the form of barrier-layer rectifiers such as copper-oxide rectifiers. As well understood in the art, such rectifiers are formed of a stack of copper-oxide disk units sufficient in number to withstand the voltage applied thereacross.

The electrical circuit 1 may vary appreciably in construction. As a specific example, the electrical circuit 1 may include a direct-current generator 17 for applying a voltage between the terminals 3 and 5. This generator is connected through conductors 19 and 21 to a direct-current motor 23. The direct-current generator 17 may be arranged for variable voltage control and may have its polarity reversible. Such variable voltage generators are well known in the art for controlling the rate and direction of rotation of the direct-current motor 23.

For ground-fault detection a suitable source of voltage is connected between the terminal 7 and ground. Although a direct voltage may be employed for this purpose, the polarity of such a voltage must be such that it urges current through the unidirectionally-conductive devices 13 and 15 in the direction of the arrows $I_{13}$ and $I_{15}$ when a ground fault occurs on the electrical circuit 1. On the other hand, no care in selecting polarity is required in applying an alternating voltage between the terminal 7 and ground. For this and other reasons a transformer 25 is illustrated for applying a fault-detecting voltage to the electrical circuit 1. The transformer 25 has a primary winding 27 and a secondary winding 29 which is insulated from the primary winding. The primary winding 27 may be connected to a suitable alternating-current generator or alternating-current line. The provision of a transformer having insulated primary and secondary windings eliminates the grounding of the alternating-current generator or line if such grounding is undesirable. One terminal of the secondary winding 29 is connected to ground. The remaining terminal is connected through the energizing winding of a relay 31 to the terminal 7. Consequently, the secondary voltage of the transformer is applied between both terminals 3 and 5 of the electrical circuit 1 and ground.

When the secondary winding 29 supplies current to a ground fault, the current in flowing through the energizing winding of the relay 31, causes the relay to pick up and close its front contacts 33. These contacts may be employed for any desired control function. In the specific embodiment illustrated, closure of the contacts 33 connects a battery 35 across the terminals of a suitable signal device such as an electric bell 37.

It is believed that the operation of the embodiment thus far described is obvious from the foregoing discussion. If a ground fault $F_1$ occurs on the conductor 19 of the electrical circuit 1, a circuit is completed across the secondary winding 29 of the transformer. In response to the resulting flow of current, the relay 31 closes its front contacts 33 to energize the signal device 37. Consequently, the presence of the fault $F_1$ is indicated and the fault can be repaired before a second fault on the electrical circuit 1 results in serious damage thereto. It should be observed that in response to the fault $F_1$ the secondary winding 29 directs a succession of half-waves, or a pulsating direct current, through the unidirectionally-conductive device 13 to energize the relay 31. In other words, the relay 31 is energized by a pulsating direct current rather than by an alternating current.

Should a ground fault $F_2$ occur on the conductor 21 of the electrical circuit, a similar pulsating current flows through the unidirectionally-conductive device 15 to energize the relay 31. As an example of specific values which may be encountered in practice, the secondary winding 29 may have an output voltage of 250 volts. If the relay 31 picks up when energized by currents equal to or greater than 5 milliamperes, the signal device 27 indicates the presence of faults having a resistance of 50,000 ohms or less.

In a somewhat similar manner, ground faults $F_3$ or $F_4$ occurring on the armature conductors of the generator 17 and the motor 23 produce a flow of current through one or both of the unidirectionally-conductive devices 13 and 15 to energize the relay 31. It should be observed that the voltage induced in the armature conductors of direct-current motors and generators is an alternating voltage. For this reason the ground faults $F_3$ and $F_4$ complete a circuit not only for the voltage across the secondary winding 29, but the alternating voltage of the armature conductors. This additional voltage produces a pulsating current through one or both of the unidirectionally-conductive devices 13 and 15. The frequency of the voltage induced in the armature conductors and the rate of pulsation of the current produced thereby depend on the rate of rotation of the armature conductors at the time of the fault.

Ground fault detection of additional circuits similar to the electrical circuit 1, or differing therefrom, may be effected by the same relay 31 by connecting the additional electrical circuit or circuits to the terminal 7. For example, an electrical circuit 39 is shown on the drawing. This circuit 39 has two terminals 41 and 43 across which a voltage is applied. This voltage may be produced by an alternating-current generator 44. The terminals 41 and 43 are connected to the terminal 7 through unidirectionally-conductive devices 45 and 47 which may be similar to the devices 13 and 15. Ground faults occurring on the electrical circuit 39 are detected by the relay 31 in the same manner discussed for the electrical circuit 1. For example, if the terminal 41 becomes grounded by a fault, current flows from the grounded terminal of the secondary winding 29 through ground to the terminal 41. From the terminal 41 the current flows through the device 45, the terminal 7 and the energizing winding of the relay 31 to the ungrounded terminal of the secondary winding 29. In response to this current, the relay 31 closes its contacts 33 to energize the bell 37 and indicate the presence of the fault on the terminal 41.

Although the invention has been described with reference to certain specific embodiments thereof, numerous modifications are possible. Therefore the invention is to be restricted only by the appended claims.

I claim as my invention:

1. In a protective arrangement responsive to ground faults occurring on an electrical system having terminals across which a voltage is applied, said system including means for applying a voltage across the terminals, a source of electrical energy independent of said system, means for connecting said source of electrical energy between said electrical system and ground, said connecting means comprising a conductive connection for connecting said source to both of said terminals, and unidirectionally-conductive means in said conductive connection for preventing the flow of current therethrough in response to a voltage across said terminals, and translating means responsive to current supplied by said source through said connecting means when a ground fault occurs on said system.

2. In an electrical system having ground fault protection, means for producing a direct voltage, a direct current electrical circuit including terminals across which a direct voltage is applied from said means, means for applying an alternating voltage between said electrical circuit and ground, said last-named means including a circuit connection from a common point to each of said terminals, unidirectionally-conductive means in each of said circuit connections for permitting the flow of current in said circuit connections only in a single direction with respect to said common point, whereby said terminals are not conductively connected to each other, and translating means responsive to current flowing through said point.

3. In an electrical system having ground fault protection, means for producing a voltage, an electrical circuit having terminals across which a voltage is applied from said means, a source of alternating current independent of said circuit, means for connecting said source of alternating current between said electrical circuit and ground, whereby a ground fault on said electrical circuit completes a circuit for said source, said last-named means comprising a separate unidirectionally-conductive device in the connection of each of said terminals to said source, said unidirectionally-conductive devices being disposed to permit the flow of current in the same direction relative to said source, whereby said devices prevent the flow of current therethrough between said terminals when a voltage is applied across said terminals, and translating means responsive to current supplied by said source when a ground fault occurs on said electrical circuit, said source comprising a transformer having primary and secondary windings which are insulated from each other.

4. In an electrical circuit having ground fault protection, means for producing a voltage, an electrical circuit including terminals between which a voltage is applied from said means, a pair of unidirectionally-conductive devices, conducting means connecting said conductive devices in a series circuit across said terminals, said conductive devices being oppositely directed in said series circuit to prevent the flow of current in said series circuit in response to the application of a voltage of any polarity across said terminals, an electrical transformer having a primary winding and having a secondary winding insulated from said primary winding and independent of said electrical circuit, means connecting a first terminal of said secondary winding to said series circuit intermediate said unidirectionally-conductive devices, means connecting a second terminal of said secondary winding to ground, whereby a ground fault on said electrical circuit completes a circuit for said secondary winding, and relay means connected for energization in accordance with current supplied by said secondary winding to a ground fault on said electrical circuit.

5. In a protective arrangement responsive to ground faults occurring on a direct current electrical system having terminals across which a voltage is applied and having means for applying a direct voltage between said terminals, a source of alternating electrical energy, means for connecting said source of alternating electrical energy between said electrical system and ground, said means comprising a conductive connection for connecting said source to both of said terminals, and unidirectionally-conductive means in said conductive connection for preventing the flow of current therethrough in response to said direct voltage across said terminals, and translating means responsive to current supplied by said source through said connecting means when a ground fault occurs on said system.

6. In a protective arrangement responsive to ground faults occurring on a direct-current electrical system having a pair of terminals, said system including means for applying a direct voltage between said terminals, a source of electrical energy, conductive means extending between said terminals, said conductive means including unilaterally-conductive means for preventing the flow of current therethrough in response to said direct voltage across the terminals, and means connecting said source between ground and a point on said conductive means for establishing a voltage between said system and ground, said connecting means comprising translating means responsive to current passing between said point and ground when a ground fault occurs on said system.

7. In a protective arrangement responsive to ground faults occurring on a direct current electrical system having a pair of terminals, said system including means for applying a direct voltage between said terminals, a source of alternating electrical energy, said source comprising a transformer having a primary winding and a secondary winding insulated from said primary winding, conductive means extending between said terminals, said conductive means including unilaterally-conductive means for preventing the flow of current therethrough in response to said direct voltage across the terminals, and means connecting said secondary winding between ground and a point on said conductive means for establishing a voltage between said system and ground, said connecting means comprising translating means responsive to current passing between said point and ground through said secondary winding when a ground fault occurs on said system.

WILLARD G. COOK.